July 9, 1940.    R. T. CLOUD    2,206,864
ELECTRICAL LOGGING OF EARTH FORMATIONS
Filed April 11, 1939
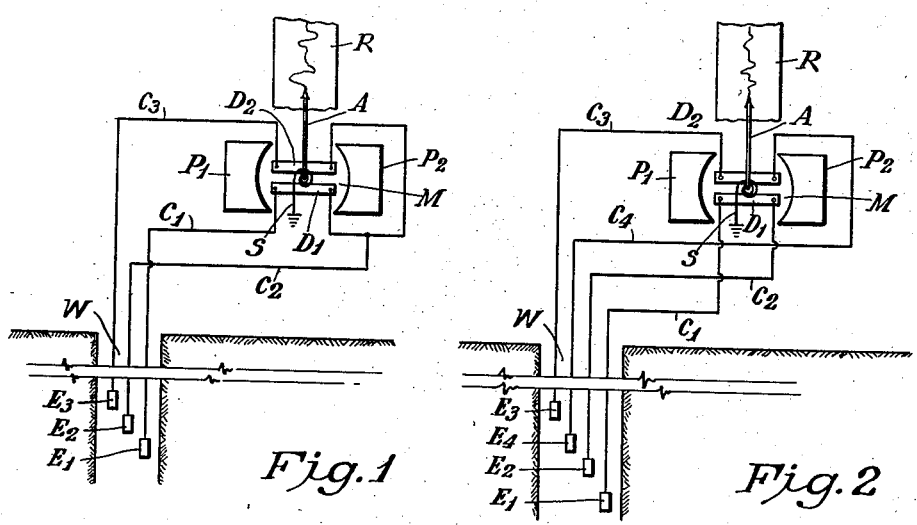
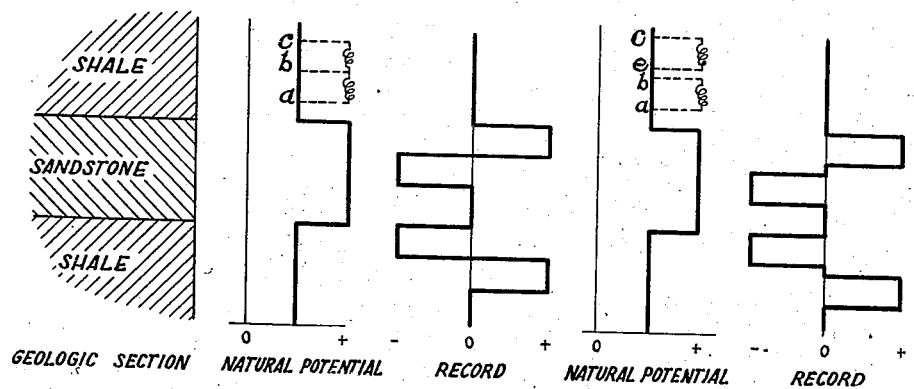
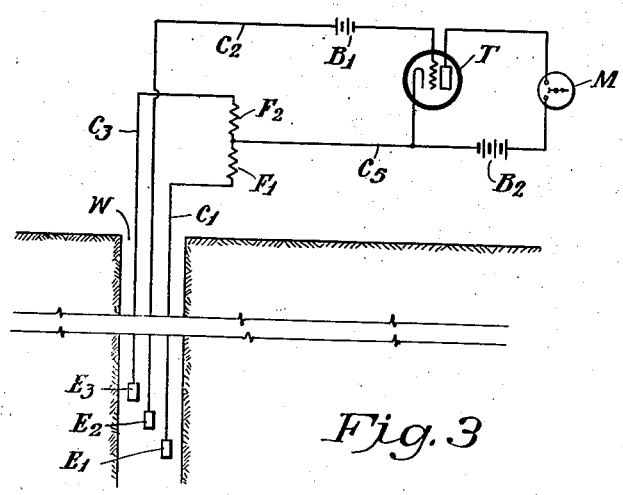
INVENTOR
Raymond T. Cloud
BY Clarence H. Seeley
ATTORNEY Patented July 9, 1940

2,206,864

UNITED STATES PATENT OFFICE 2,206,864

ELECTRICAL LOGGING OF EARTH FORMATIONS

Raymond T. Cloud, Tulsa, Okla., assignor to Stanolind Oil and Gas Company, Tulsa, Okla., a corporation of Delaware Application April 11, 1939, Serial No. 267,281

13 Claims. (Cl. 175—182)

This invention relates to the electrical logging of earth formations and more particularly to methods and apparatus for making a record of the porous or liquid-bearing strata traversed by a well or bore hole.

A number of methods of logging wells electrically are known to the art and among them are methods which distinguish the various strata by measuring their specific resistivities or some function thereof. The more practical of these resistivity methods differentiate certain strata sufficiently well for correlation purposes, but none of them gives enough information to locate points of entry of water or oil. For example, a stratum of shale has about the same specific resistivity as a water-bearing sandstone, so that the location of the latter cannot be determined with accuracy by a resistivity method.

The necessity for locating water-bearing strata within relatively close limits is well recognized because without such information it is not possible to seal off water from entering the well, for example by cementing, while permitting the entry of oil. Strata bearing liquids are distinguished from strata that do not contain an appreciable amount of fluid by the fact that the natural potentials existing between points located in such strata are greater than those in the closely packed strata carrying little or no fluid. The source of these natural potentials is not entirely understood, the principal theories being that they are due to the motion of the liquids through the capillary interstices of the porous structure or to electrochemical action in the earth, but the fact remains that natural potentials do exist under the conditions stated.

In the past these natural potentials have been measured directly by lowering an electrode down the well and measuring the potential difference between this electrode and another at the surface or lowering two vertically-spaced electrodes and measuring the potential gradient across them. These procedures often fail to define the boundaries of porous strata with the exactness necessary to insure that the proper steps can be taken to exclude water and admit oil.

It is an object of my invention to provide a method and apparatus by which an extremely clear indication is given of the boundaries of porous strata traversed by a bore hole. Another object is to provide a novel system for utilizing relative rather than absolute values of natural potential whereby easily interpreted logs of porous strata in wells can be obtained. Further objects and advantages of my invention will be apparent from the following description thereof read in conjunction with the drawing, in which:

Figures 1, 2 and 3 show schematically forms of apparatus for obtaining porosity logs according to my invention.

Figure 4A shows a typical geologic section with a stratum of sandstone between layers of relatively impervious shale.

Figures 4B and 4D are graphs showing the natural potentials at various levels within a well traversing the formations of Figure 4A with respect to a point on the surface.

Figures 4C and 4E illustrate idealized records of the type obtainable utilizing the apparatus of Figures 1 and 2, respectively.

In one of its broadest aspects my invention comprises measuring a function of the difference between the substantially vertical natural potential gradients existing across each of two different zones disposed substantially vertically with respect to each other within the well in which it is desired to locate the porous strata. This is best accomplished by changing the level of an array of at least three vertically spaced electrodes within the well being logged and measuring a function of the difference between the potential gradients across adjacent electrodes. In order to obtain the clearest indications it is preferred that the distances between the electrodes across which the potential gradients are measured be approximately equal, although other arrangements can be used. Preferably the logging operation is carried out continuously and the measurements recorded, but if desired readings can be taken at any desired intervals of depth or time. The well to be logged must, of course, be uncased so that the natural potentials in the various formations will be impressed on the electrodes in the well and the latter is preferably filled with a fluid such as water or drilling mud at the levels to be logged so that the electrodes will be in electrical contact with those formations, although under some conditions electrodes making mechanical contact with the well walls can be used. The electrodes are preferably of a non-polarizing type and should be substantially identical in order to avoid the production of undesired electromotive forces.

Various methods of measuring or recording a function of the difference between the natural potential gradients according to my invention can be used. One method which is particularly suitable is to impress each of these potential gradients across a coil of a differential voltmeter so that the motion of the moving element therein is responsive to the difference between the potential gradients. Another method is to measure or record by means of a galvanometer the potential difference between the intermediate electrode in a three-electrode array and the mid-point of a resistance shunted across the other two electrodes. Other methods which will be apparent to those skilled in the art in the light of this disclosure are also applicable and are contemplated as a part of my invention.

My invention also includes a number of other features and these will be brought out as the description proceeds. Referring now to the drawings, Figure 1 shows schematically the essential apparatus for practicing the preferred form of my invention in which a three-electrode array is used, the intermediate electrode thereof serving to define one limit of each zone across which a natural potential gradient is taken. Electrodes $E_1$, $E_2$ and $E_3$, which are preferably but not necessarily equally spaced, are lowered into well W by conventional means not shown, and are connected by means of electrical conductors $C_1$, $C_2$ and $C_3$ respectively to differential voltmeter M. The distance between electrodes $E_1$ and $E_2$ and between electrodes $E_2$ and $E_3$ will generally be relatively small, for example about 1 to 5 feet. Differential voltmeter M has two coils $D_1$ and $D_2$ aligned with each other and arranged to rotate together between magnetic pole pieces $P_1$ and $P_2$. Spring S is provided to oppose the rotation of coils $D_1$ and $D_2$ in both directions. The electrical circuits are completed by connecting coils $D_1$ and $D_2$ across conductors $C_1$ and $C_2$, and $C_2$ and $C_3$, respectively. Meter M is also preferably provided with recording means and these are shown as pen arm A and recording medium R, which generally will be moved in the conventional manner at a rate proportional to that at which the level of the electrode array in the well is changed.

In locating porous strata with the apparatus of Figure 1, the level of the array consisting of electrodes $E_1$, $E_2$, and $E_3$ is changed, preferably continuously, and the natural potentials between electrodes $E_1$ and $E_2$ and between electrodes $E_2$ and $E_3$ at every instant are impressed on coils $D_1$ and $D_2$. These coils are so arranged that the currents flowing through them tend to produce magnetic fields of opposite polarity and they therefore attain a position which is a known function of the resultant or difference between these magnetic fields and which consequently is a function of the difference between these natural potential gradients. As the electrodes in the well are raised or lowered, arm A changes position as the difference between these potential gradients changes, thus giving a log of such changes on recording medium R. The record obtained in this way is particularly adapted to locating the interfaces between porous and non-porous strata since it is not influenced by the absolute value of the natural potentials present, but only by the difference between potential gradients, which shows relatively great variations and makes the record easy to read and interpret.

A slightly modified apparatus is shown in Figure 2 in which an array of four electrodes is used within a well W to be logged. In this case the natural potential gradient across electrodes $E_1$ and $E_2$ is impressed on coil $D_1$ by means of conductors $C_1$ and $C_2$ while that across electrodes $E_4$ and $E_3$ is impressed on coils $D_2$ by means of conductors $C_4$ and $C_3$. The operation of this form of my invention is the same as that described in connection with Figure 1 and the record obtained is only slightly different as shown on Figure 4. Electrodes $E_2$ and $E_4$ are preferably spaced more closely than the other electrodes in the array, and can be reversed in position if desired.

Figure 3 illustrates a form of my invention in which an entirely different method of measuring or recording a function of the difference between two natural potential gradients is used. As in Figure 1, electrodes $E_1$, $E_2$ and $E_3$ are lowered into well W in a vertically spaced array, and are connected to conductors $C_1$, $C_2$, and $C_3$, respectively, leading to the top of the well. Two resistances, $F_1$ and $F_2$, which are preferably of equal and very large resistivity, are placed in series across conductors $C_1$ and $C_3$, and another conductor $C_5$ is connected at a point between the resistances. The potential difference across conductors $C_2$ and $C_5$ will be at every moment a function, which is one-half when the resistances $F_1$ and $F_2$ are equal, of the difference between the natural potential gradient between electrodes $E_1$ and $E_2$ and that between electrodes $E_2$ and $E_3$. By impressing this potential difference upon an indicating, or preferably a recording galvanometer, an indication or record is obtained from which the interfaces between porous and non-porous formations can be located with precision.

In order to demonstrate that the above relation holds, let us assume that the values of the natural potential of electrodes $E_1$, $E_2$, and $E_3$ are $a$, $b$ and $c$ respectively. As stated above, the quantity which it is desired to measure is a function of the difference between the potential gradients across the adjacent electrodes, and this difference can be expressed:

$$(a-b)-(b-c) \text{ or } (a+c)-2b$$

Other possibilities falling within this definition are:

$$(b-c)-(a-b) \text{ or } 2b-(a+c)$$
$$(c-b)-(b-a) \text{ or } (a+c)-2b$$
$$(b-a)-(c-b) \text{ or } 2b-(a+c)$$

It is thus seen that the absolute value of this difference is always the same for each value of $a$, $b$ and $c$, but the polarity of the reading will depend upon the particular hook-up used. It is apparent that the potential of conductor $C_5$ will be between that of conductor $C_1$ and conductor $C_3$, and that if resistances $F_1$ and $F_2$ are equal, this potential will be half-way between them. Therefore if we let $d$ represent the potential of conductor $C_5$ $$d = \frac{a+c}{2}$$

Since the potential of conductor $C_2$ is $b$, which equals $$\frac{2b}{2}$$

the potential difference across conductors $C_2$ and $C_5$ is either $$\frac{(a+c)-2b}{2} \text{ or } \frac{2b-(a+c)}{2}$$

which expressions are one-half of those given above. By the use of this arrangement, therefore, the desired quantity is measured without the use of a differential voltmeter.

Usually the natural potentials encountered down a well are very small, sometimes as low as a few millivolts, and there is often insufficient energy to operate the relatively rugged types of recording meters suitable for field use. It is, therefore, desirable and sometimes necessary to amplify these potentials before they are utilized in accordance with my invention. There is also an additional advantage in impressing the natural potentials of the well electrodes upon the grids of amplifying tubes inasmuch as these grids can be biased so as to draw no current from the source. Even small currents would appreciably affect the readings in some cases, for example when attenuated electrolytes in the well fluid interpose a high resistance in series with the potential measuring circuit.

One stage of amplification is illustrated in connection with Figure 3, although two or more stages can be used, and amplification can readily be applied to other forms of my invention by those skilled in the art. As shown, conductor $C_2$ is connected through biasing battery $B_1$ to the grid of amplifying vacuum tube T, while conductor $C_5$ is connected to its cathode. The plate circuit of tube T carrying the amplified current includes plate battery $B_2$ and meter M, which is a galvanometer of any suitable type, but is preferably provided with recording means.

Examples of some types of records obtained according to my invention are given in idealized form in Figures 4C and 4E. Figure 4A shows a typical geologic section with a stratum of sandstone between layers of relatively impervious shale, and the natural potential at various levels within a well traversing this section with respect to a point on the surface is illustrated by Figure 4B. It is of course recognized that the natural potentials are not as constant for a given stratum and that the changes at the boundaries of porous strata are not as abrupt as shown, but these illustrations will serve to assist in clarifying my invention further.

Also shown on Figure 4B is the value of the potentials applied to the two meter coils $D_1$ and $D_2$, points $a$, $b$ and $c$ representing the natural potentials of the electrodes $E_1$, $E_2$ and $E_3$ respectively using the apparatus of Figure 1. It is apparent that when the electrode array is in the position shown, the potential differences across coils $D_1$ and $D_2$ will be equal so that their difference will be zero, and that the resultant meter reading will remain zero as the electrode array is lowered until point $a$ reaches the upper interface. Then the potential gradient across coil $D_1$ ($a-b$) will be greater than that across coil $D_2$ ($b-c$) and a deflection similar to that shown in Figure 4C will be obtained which corresponds to the increase in the difference of the potential gradient across coil $D_1$ over that across coil $D_2$. An equal deflection in the opposite direction can of course be obtained by suitably reversing connections, etc., which would be equally useful. When point $b$ reaches the interface the potential gradient across coil $D_1$ will become approximately zero, and that across coil $D_2$ assumes a positive value so that a negative deflection will be obtained. Obviously when point $c$ reaches the interface the potential gradient across the coils will again be equal and the reading will again be approximately zero. Similarly a like series of deflections but of opposite sign will be obtained as the electrodes pass the lower interface. These deflections can be accurately interpreted to give the locations of the boundaries of the porous stratum with a minimum of difficulty because of the sudden reversals of polarity of the readings obtained, and the identification of these boundaries as upper or lower is easily made by noting the direction of these reversals. Figure 4D shows the relationship of the coils $D_1$ and $D_2$ to the natural potentials of electrodes $E_1$, $E_2$, $E_3$ and $E_4$ of Figure 2, which are represented by points $a$, $b$, $c$ and $e$ respectively. It will be apparent that lowering this electrode array will give a record such as that shown in Figure 4E, which is easily interpreted since the electrode spacing is, of course, known.

Usually the natural potentials down a well are all of the same polarity with reference to a fixed point at the surface. However, in some cases there is a reversal of potential at one or more points down the well, and a false record will be obtained with the indicated locations of the porous and non-porous structures reversed unless these points of reversal are known. Means for changing the polarity of the recording apparatus to compensate for this can be provided.

Many apparatus details have been omitted for the sake of simplicity but these can be readily supplied by those skilled in the art. For example, the complete filament circuit of the vacuum tube illustrated is not known, nor are various switches, resistances, etc. Obviously when the vacuum tubes are used they should be such that the plate current will be substantially linear with respect to grid voltage over the range in which they are operated.

While I have described my invention in connection with certain specific embodiments thereof, I do not desire to be limited thereto, but only by the following claims in which I have defined my invention.

I claim:
1. The method of logging earth formations traversed by a well which comprises measuring a function of the difference between the substantially vertical natural potential gradients existing across each of two different zones disposed substantially vertically with respect to each other in said well.

2. The method of logging earth formations traversed by a well which comprises producing separate electrical effects responsive to the substantially vertical natural potential gradients existing across each of two different zones disposed substantially with respect to each other in said well, and measuring a function of the difference between said separate electrical effects.

3. The method of logging earth formations traversed by a well which comprises changing the level of an array of three vertically spaced electrodes within said well and measuring a function of the difference between the natural potential gradients existing between the adjacent electrodes in said array.

4. The method of logging earth formations traversed by a well which comprises changing the level of an array of at least three vertically spaced electrodes within said well and measuring a function of the difference between the natural potential gradients between the top electrode and an intermediate electrode in said array and between an intermediate electrode and the bottom electrode in said array.

5. The method of locating the boundaries of porous formations traversed by a fluid-containing well which comprises changing the level of an array of at least three vertically spaced electrodes within said well, and recording a function of the difference between the natural potential gradients between the top electrode and an intermediate electrode in said array and between an intermediate electrode and the bottom electrode in said array.

6. The method of locating the boundaries of porous formations traversed by a fluid-containing well which comprises changing the level of an array of three vertically spaced electrodes within said well, producing separate electrical effects responsive to the natural potential gradients between the top and intermediate electrodes and between the intermediate and bottom electrodes in said array, and measuring a function of the difference between said separate electrical effects.

7. The method of claim 6 wherein said electrodes are equally spaced.

8. The method of locating the boundaries of porous formations traversed by a fluid-containing well which comprises changing the level of an array of three vertically spaced electrodes within said well, applying the natural potential difference between the top and bottom of said electrodes across two resistances in series and measuring a function of the difference between the natural potential of the intermediate of said electrodes and the potential at a point between said resistances.

9. The method of claim 8 wherein said electrodes are equally spaced and said resistances are equal.

10. Apparatus for logging earth formations traversed by a well comprising an array of at least three electrodes adapted to be lowered into said well, and means for measuring a function of the difference between the natural potential gradients between the top electrode and an intermediate electrode in said array and between an intermediate electrode and the bottom electrode in said array.

11. Apparatus according to claim 10 wherein said measuring means includes means for recording the measurements obtained.

12. Apparatus for locating the boundaries of porous formations traversed by a fluid containing well comprising an array of three vertically spaced electrodes adapted to be lowered into said well, a differential voltmeter, and means for impressing upon the coils of said voltmeter the natural potential gradients between the top and intermediate electrodes and between the intermediate and bottom electrodes in said array.

13. Apparatus for locating the boundaries of porous formations traversed by a fluid containing well comprising an array of three vertically spaced electrodes adapted to be lowered into said well, two resistances in series, means for impressing the natural potential between the top and bottom electrodes in said array across said series of resistances, and means for measuring a function of the potential difference between the intermediate electrode in said array and a point between said resistances.

RAYMOND T. CLOUD.

CERTIFICATE OF CORRECTION.

Patent No. 2,206,864. July 9, 1940.

RAYMOND T. CLOUD.

It is hereby certified that error appears in the printed specification of the above numbered patent requiring correction as follows: Page 3, second column, line 47, claim 2, after the word "substantially" insert --vertically--; and that the said Letters Patent should be read with this correction therein that the same may conform to the record of the case in the Patent Office.

Signed and sealed this 3rd day of September, A. D. 1940.

(Seal)

Henry Van Arsdale,
Acting Commissioner of Patents.